United States Patent [19]

Harris et al.

[11] Patent Number: 4,508,278
[45] Date of Patent: Apr. 2, 1985

[54] TANDEM STRIPPING AND REVERSING APPARATUS

[75] Inventors: Robert N. Harris, Athens, Ga.; Michael E. McGuire, Olathe, Kans.

[73] Assignee: Ericsson, Inc., Greenwich, Conn.

[21] Appl. No.: 523,065

[22] Filed: Aug. 15, 1983

[51] Int. Cl.³ .................. B65H 54/00; B29C 17/02
[52] U.S. Cl. .................................. 242/1; 29/426.6; 264/295; 425/391
[58] Field of Search ............... 242/1; 425/391, 403.1, 425/DIG. 7; 264/281, 295, 339; 29/426.6; 140/149

[56] References Cited

U.S. PATENT DOCUMENTS

| | | |
|---|---|---|
| 127,436 | 6/1872 | Smith . |
| 378,893 | 3/1888 | McIntyre . |
| 611,120 | 9/1898 | Hamilton . |
| 777,576 | 12/1904 | Wantling . |
| 2,478,861 | 8/1949 | Collins et al. ............ 264/295 |
| 2,575,747 | 11/1951 | Cook ......................... 425/391 |
| 2,718,659 | 9/1955 | Judisch ................. 425/391 X |
| 2,718,660 | 9/1955 | Day ..................... 425/391 X |
| 2,898,630 | 8/1959 | Adams ................. 425/391 X |
| 2,920,348 | 1/1960 | Franke, Jr. .............. 425/391 |
| 3,184,795 | 5/1965 | Howell, Jr. .......... 425/391 X |
| 3,656,516 | 4/1972 | Hardesty ............ 425/DIG. 7 |
| 3,988,092 | 10/1976 | Bloxham ............ 425/391 X |

Primary Examiner—John M. Jillions
Attorney, Agent, or Firm—Pennie & Edmonds

[57] ABSTRACT

Apparatus for constantly pulling and stripping a cord from a coiled disposition about a mandrel for moving the free cord in a direction substantially perpendicular to the path of movement of the cord on the mandrel. The apparatus includes a pinch roller assembly for pulling and stripping the cord and for both imparting movement to the cord in a downstream direction while the cord is immobilized rotationally at a transition point of pulling and driving of the cord. A reverse drive apparatus grips the cord and moves away from the pinch roller assembly as the cord between the free end and the point of immobilization is reverse wound into a coil tighter than the coil on the mandrel. The reverse drive apparatus moves to accommodate the ever increasing length of cord driven by the pinch roller assembly.

14 Claims, 5 Drawing Figures

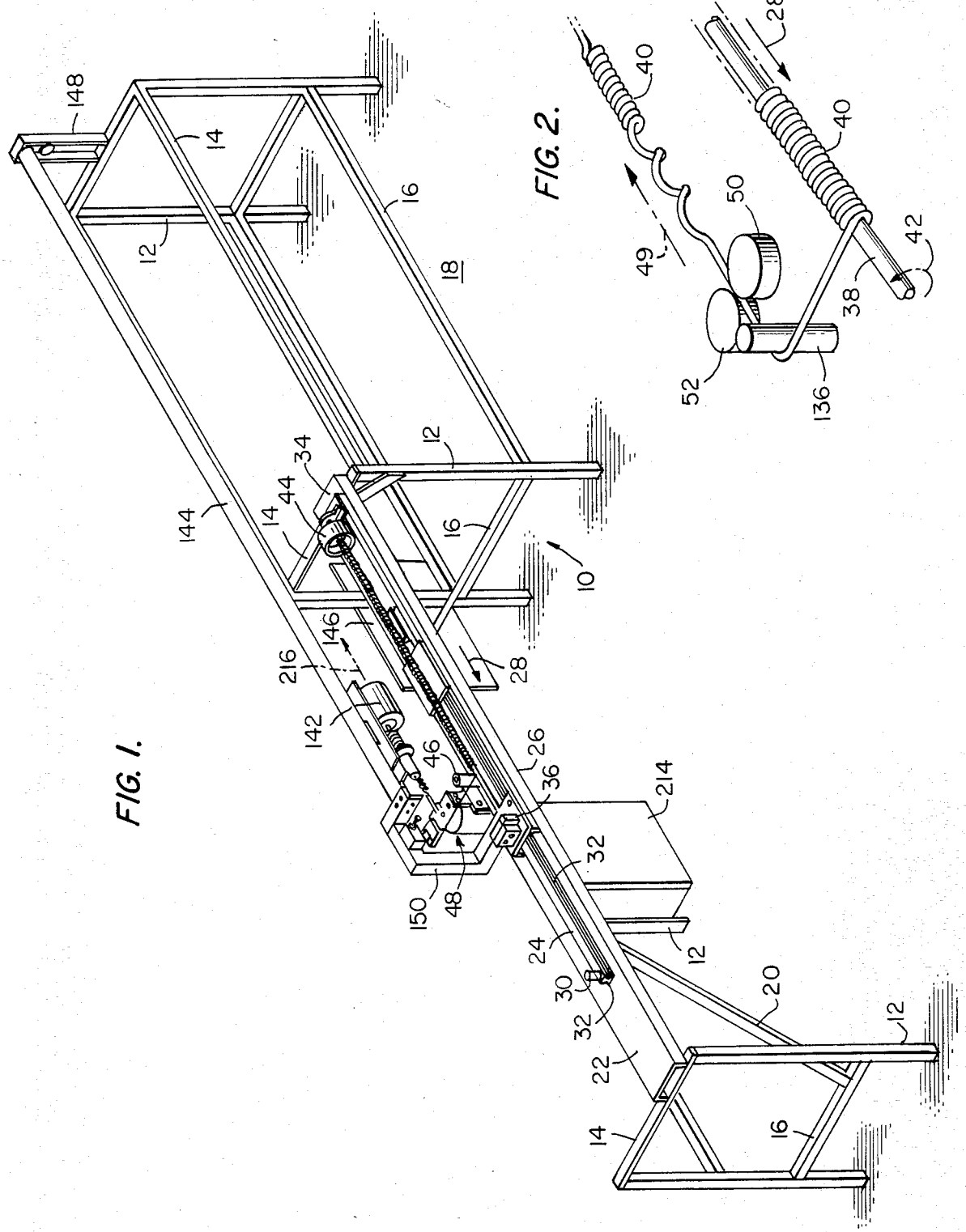

TANDEM STRIPPING AND REVERSING APPARATUS

DESCRIPTION

1. Technical Field

The invention relates to apparatus for stripping the full length of a cord from a support about which it is coiled, and for reverse winding the cord continuously as it is stripped to twist and consequently tighten the coil.

2. Background Art

In the prior art, several methods are known for reverse winding a cord. With a cord coiled on a mandrel, and a stripping and reversing apparatus located at right angles to the mandrel, a pair of jaws of the apparatus is provided to both grip the end of the cord and pull the cord progressively to strip it from the mandrel. The feeding of the end of the cord to the jaws is carried out manually, and when the cord is gripped the jaws are rotated to effect reverse winding to twist and tighten the coil. The coil tightens to a measure of tightness greater than the tightness of the cord within the coiled disposition on the mandrel.

The apparatus has been found to operate successfully on short lengths of cord. The apparatus, however, has been found to suffer certain disadvantages. One disadvantage arises through constraints of space for completion of the operation of pulling and stripping a longer length of cord, for example, a cord of twenty-five feet, which is to be reverse wound. This disadvantage may be exemplified by the requirement of an amount of space for the operation of pulling and stripping the cord substantially equal to the length of cord which is to be pulled and stripped and reverse wound. Another disadvantage, one which possibly is of greater significance, has its foundation in the pulling and stripping operation itself. To this end, during pulling and stripping, the jaws which shall have gripped the end of the cord move away from the mandrel so that the length of cord which is pulled is constantly increasing. The effect is that the pulling force varies the amount of extension of the cord, resulting in irregularity in the coil of cord created as the cord is reverse wound.

According to another method, a cord is pulled and stripped from a mandrel by a belt drive located at right angles to the mandrel. The lead end of the cord, then, is entered into a form of cylinder within which following increments of length of cord are to be reverse wound during a continuous process. This method of reverse winding a cord, either of short or longer length, as discussed above, has not met with any considerable success. Even though the internal diameter of the cylinder was selected to develop friction between the cord surface it was found that surface lubricants, such as silicone, tended to reduce the amount of friction and prevent reverse winding. On the other hand, if the internal diameter of the cylinder was significantly reduced it was found that the cord would "hang-up" within the cylinder, likewise preventing reverse winding.

Instead of using a machine, oftentimes the cord is pulled and stripped from the mandrel by hand. The pulling and stripping of the cord generally is carried out in a direction axially of the mandrel upon which the coil was formed. This operation entails, first, twisting the cord while on the mandrel in a direction which is the reverse of the lay of the cord. In the forming and thermosetting operation the cord may undergo thermal shrinkage so that it adheres to the mandrel. Thus, twisting the cord will tend to release it from an adhering position along the mandrel. Thereafter, the cord, in the coiled orientation, is pulled from the mandrel. While axial pulling and the forces attendant to the pulling action, may be carried out fairly successfully by experienced personnel, the operation requires considerable technique. The technique oftentimes requires a considerable pulling force to break the adhering bond between the cord and the mandrel, even though the cord may have been twisted. This pulling force in many instances must be necessarily large and the pulling force and the pulling action frequently stretches the cord through a lack of uniformity in the pull. The lack of pulling uniformity in the pull results in irregular coils. In addition, a second, subsequent operation then must be effected by the operator to reverse wind the stripped cord. The operation involves attaching an end of the cord removed from the mandrel on a rotatable jaw or chuck which, placed in operation, reverse winds the cord as the operator feeds the cord to the chuck. The operation requires a constant feed to maintain the cord somewhat taut. This is a difficult operation and in the absence of care an irregularity in the coil may result.

SUMMARY OF THE INVENTION

The invention is an improvement over the known apparatus for pulling and stripping cord coiled on a mandrel, and over the hand pulling and stripping technique, as well. In a broad aspect, the improvement resides in the universality of the tandem stripping and reversing apparatus, that is, the capability of the apparatus to act upon a coil of cord of substantially any length.

The invention envisions the method of reverse winding a cord pulled and stripped from a mandrel upon which it is formed to coil the cord tighter than the cord was coiled during formation. The pulling and stripping of the cord is carried out as the mandrel and the cord carried on the mandrel moves in a first path so that the cord is pulled from the mandrel at a "pay-off" location. The cord, further, is pulled from the mandrel in a direction at right angles to the direction of movement along the first path. The cord is pulled and stripped by a pinch roller assembly, located at a fixed distance from the "pay-off" location, so that the pulling action is substantially constant and any extension in the length of cord which is pulled remains uniform. The cord pulled from the mandrel is imparted movement in a path toward a reversing apparatus which substantially immediately grips the free end of the cord. The pinch roller assembly simultaneously immobilizes the cord at some increment along its length which may be considered a transition point. As the leading end of the cord is gripped and the length of cord between the leading end and the transition point is reverse wound continuously in a direction the reverse of the coil on the mandrel, the reversing apparatus moves from the region of the transition point to accommodate the increasing length of cord which either has been or is to be reverse wound. The accommodating distance between the reversing assembly and the transition point will provide for some slack in the cord.

The apparatus for carrying out the method includes support means which may consist of a mandrel for supporting a cord coiled in one direction of lay along its length. A drive is provided to move the mandrel in a direction for locating the leading end of the cord remaining to be pulled and stripped to a "pay-off" position at which the cord may be pulled continuously in a direction substantially perpendicular to the direction of movement of the mandrel. Pinch roller structure is provided for pulling and stripping the cord, and simultaneously imparting movement to the cord toward a reversing apparatus while, at a transition point, immobilizing successive increments of length of cord against rotation. The transition point may be more particularly described as the point of transition between pulling the cord and stripping it from the mandrel and driving or imparting movement to the cord toward the reversing apparatus. The transition point remains at a constant distance from the axis of the mandrel so that there is a constant pulling action, and the reversing apparatus for gripping the leading end of the cord and rotating the cord within the length of cord between the leading end and the transition is initially located in close proximity to the pinch roller assembly The reverse winding of the cord is carried out as the reversing assembly translates in a direction of movement away from the transition point to accommodate the accumulating length of reverse coiled cord. The winding of the cord in the direction opposite to the lay of the cord on the mandrel causes the cord to coil in a manner tighter than the coil of cord when on the mandrel.

DESCRIPTION OF THE DRAWING

FIG. 1 is a perspective view of the tandem stripping and reversing apparatus of the invention;

FIG. 2 is a schematic presentation, in perspective, of a cord wound on a mandrel, and a typical path of movement taken by the cord after having been stripped from the mandrel at a pay off location and gripped by a pair of pinch rollers when acted upon by a mechanism for reversing the wind of the cord;

BEST MODE FOR CARRYING OUT THE INVENTION

Figure 3:
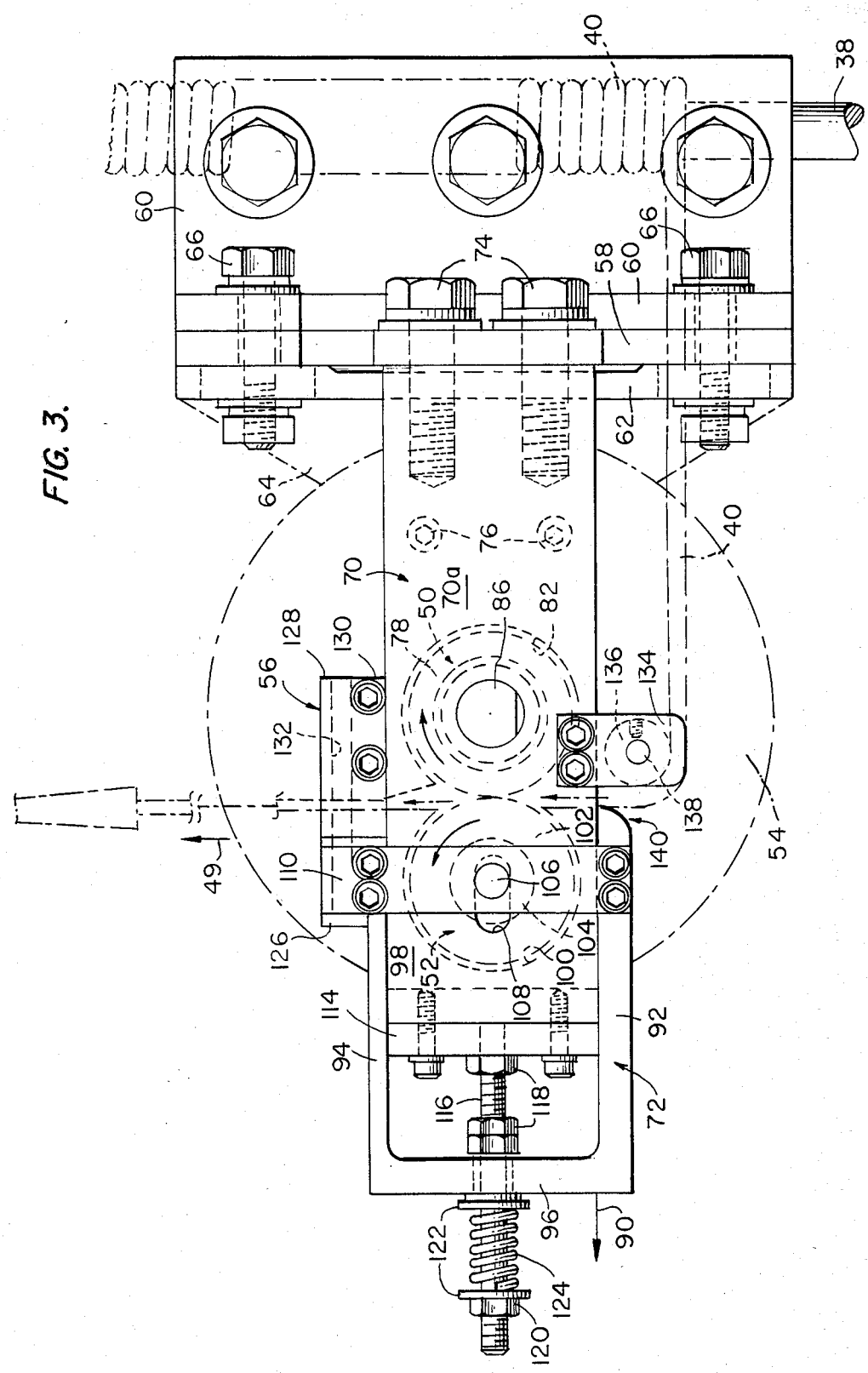
FIG. 3 is a plan view of a pinch roller drive assembly.

The tandem stripping and reversing apparatus (hereafter "apparatus") may be used to pull and strip a length of cord from a coiled disposition about a mandrel upon which the coil is formed and, as incremental lengths of cord are stripped at a "pay-off" location to immobilize the cord against rotation while imparting movement to the cord toward a reversing apparatus. The pulling and stripping of the cord from the mandrel is carried out by a pinch roller assembly located at right angles to and at a spaced disposition from the mandrel. The pinch roller assembly also functions to both immobilize the cord against rotation and impart movement to the cord. The pinch roller assembly defines a transition point for these actions. The driven length of cord, which is an increasing length, is reverse wound by the reversing apparatus initially located in close juxtaposition to the transition point. As the cord is reverse wound the reversing apparatus translates from the transition point to accommodate the increasing length of cord. The reverse wind and tightening of the coil is carried out continuously along the full length of the cord carried on the mandrel.

The apparatus has a specific use in reverse winding and tightening a telephone cord.

Referring to FIG. 1, a framework 10 is schematically illustrated. The framework includes a plurality of legs 12, and support structure including a plurality of elements 14 providing a horizontal base for supporting the operative components of the apparatus. A further plurality of elements 16, disposed below the base elements, may be provided to brace the legs near a surface 18 upon which the apparatus is supported. Additional support structure in the form of a brace 20 may be provided if increased stability of the framework is necessary. The braces 20 preferably may extend along a diagonal between a horizontally disposed brace 16 and a mount 22.

The mount 22 is in the form of a channel including a pair of legs extending from a flat web. The legs are supported between a pair of elements 14. The mount provides support for a runner 24 and a slide 26 movable along the runner. Referring to FIG. 1, the slide is illustrated in a position for movement from a first position in the direction of arrow 28 toward a second position. A stop 30 is located at the end of the runner toward which the slide moves. The stop interacts with a second stop (not shown) carried on the underside of the slide. The stop determines a terminal position for the slide following full movement in the direction of arrow 28. Similar stops (not shown) located at opposite ends of the runner and slide interact to determine the other terminal position.

The runner 24 may be in the form of an elongated rectangular member (in section) including a pair of grooves 32 on opposite sides of the runner along substantially the full length. The slide supports two or more pairs of rollers or bearing structure (not shown) for freedom of movement of the slide between the terminal positions. The particular structure to provide freedom of movement is conventional.

A pair of brackets 34, 36 are located along slide 26. A mandrel 38 of the type upon which a cord 40, such as telephone cord may be formed is adapted for support between the brackets. Preferably, the opposite ends of the mandrel are mounted in a bearing (not shown) carried by each of the brackets. In this manner, the mandrel will be free to rotate about its axis, in the direction of the arrow 42 as illustrated in the schematic presentation of FIG. 2. The bracket 34 preferably is located at one end of the slide and bracket 36 may be adjustably located along the slide to accommodate mandrels of varying length.

A cup 44 is mounted on bracket 34. The cup is mounted in a position that the base of the cup is juxtaposed to bracket 34 and the opening into the cup extends toward bracket 36. In the mounted position, mandrel 38 will extend through the base of the cup into the bearing. When a cord is formed about the mandrel usually there will remain a free end which is not wound and which, accordingly, will extend from the mandrel. The cup provides the function of capturing the free end of the cord within the opening to overcome the tendency of the free end flapping around as the mandrel rotates.

A drive motor (not shown) is provided for driving the slide from the first to the second position. The slide may be returned to the first position to commence a second and each subsequent stripping and reversing operation either manually or by the drive motor after the operation of stripping the full length of coiled cord (hereafter "cord") from the mandrel. Preferably, the drive to the slide, in movement during the stripping of the cord will be at a constant speed. More particularly, the speed will be synchronized to the speed of operation of a pinch roller assembly to be described below which strips the cord from the mandrel, thereby to locate the end of the cord at a "pay-off" position slightly ahead of an entry to pinch roller assembly so that the cord which is stripped follows generally a path perpendicular to the axis of the mandrel.

After each operation of pulling and stripping a cord, and the return of the slide to the first position, a further mandrel supporting a cord may be mounted on the slide and the second and each subsequent operation may be commenced.

The mandrel 38 is formed by a metal rod, such as a steel rod, having a diameter to form a suitable coil. This particular material will support the weight of the cord without any substantial amount of bending or bowing in a direction perpendicular to the axis of the mandrel. A guide 46 may be located adjacent the mandrel to engage the cord on the mandrel and assist in preventing any bending or bowing of the mandrel when a pulling force is exerted in stripping the cord from the mandrel. In FIG. 1, the guide is illustrated as a form of roller, located slightly upstream of the "pay-off" position. The guide could also be located slightly downstream of the "pay-off" position. Further, the guide may be defined by a structure including a slot through which the mandrel may move and which supports the mandrel in the axial disposition.

The pinch roller assembly 48 (hereafter "drive assembly"), perhaps best seen in FIGS. 3 and 4, functions to strip cord 40 from mandrel 38, and to impart a driving movement to the cord so that the free end moves into space to be grasped and manipulated by a reversing assembly, to be discussed more fully below. As will be discussed, the reversing assembly functions to immediately grasp the free end of the cord as it moves from the drive assembly. The reversing assembly, as will also be discussed, functions to reverse wind the cord and to translate from the region of the transition point during the reverse winding to accommodate the increasing length of cord.

In FIG. 2, the cord follows a path substantially at right angles to the path of movement of mandrel 38 (the path 28) toward the drive assembly. In that Figure the path of movement of the cord is illustrated to be ultimately in a direction the reverse of the direction of movement of the cord with the mandrel. This particular movement, of course, is possible as are other paths of movement of the cord downstream of the transition point. Thus, the cord may follow a path downstream of the transition point which is coaxial with the path of movement toward the transition point, or, for that matter, practically any path of movement downstream of the transition point. The important factor is that the drive assembly is substantially at right angles to the axis of the mandrel and that the transition point remains at a constant distance from the "pay-off" position so that the pulling force is substantially constant with uniformity in any longitudinal extension of the cord.

The drive assembly generally includes a pair of rollers 50, 52, a motor 54 for driving one of the rollers, and a sensing mechanism 56 whose function it is to sense the presence or absence of a cord which shall have moved through the nip of rollers 50, 52.

The drive assembly is likewise supported on the framework 10. The drive assembly, more particularly, is supported in a position substantially at right angles to mandrel 38 and the direction of movement of the cord 40 on the mandrel. And, the structure is spaced at a distance from the path of movement of the cord and mandrel in the direction coincident to a path tangent to the surface of the mandrel (see FIG. 2).

The operative structure is mounted by a series of plates and other frame components which may be conventional. To this end, a plate 58 is supported on the mount 22 of framework 10 and extends vertically upward beyond the upper surface of the mount. A bracket 60 of L-shaped outline is located to extend between a surface of the plate 58 and the upper surface of mount 22. The plate 58 extends below the upper surface of the mount, at least along the length of one of the legs forming the channel. A plate 62 carried on bracket 64 is received juxtaposed to the other surface of plate 58. Bolts 66 or the equivalent are received through the bracket 60, plate 58 and plate 62, while further bolts 68 or the equivalent are received through the leg of mount 22, plate 58 and plate 62 to secure the structure. Motor 54 may be mounted to bracket 64 in any convenient manner.

A further pair of plates 70, 72 are mounted at the upper end of plate 58. The plates 70, 72 support the rollers 50, 52, sensing mechanism 56 and, in addition, permit movement laterally of the roller 52 relative to roller 50.

Plate 70 is secured to plate 58. A pair of bolts 74 or the equivalent are employed to secure the plates. Plate 70, more particularly, includes an upper plate portion 70a and a lower portion 70b, both of which extend from plate 58 in a superposed relation. A pair of bolts 76 may be received through both plates, in a position near plate 58, to maintain that relationship.

Roller 50 includes a disc 78 providing an operative portion in the sense of driving cord 40 and a hub 80 extending from the disc. The roller is accommodated by plate 70 in a manner whereby the plate portion 70a includes a circular cutout 82 which opens to a full cutout throughout the remaining length of the plate, and plate 70b provides a circular cutout 84 which is coaxial with the cutout 82. The roller 50, is accommodated by locating the disc 78 in cutout 82 and hub 80 in cutout 84. As illustrated in FIG. 4, the hub is secured to shaft 86 providing an output of motor 54. A set screw 88 may be provided for this purpose.

The disc 78 of roller 50 may include an outer knurled or serrated surface to assist in driving cord 40.

Plate 72 is received on plate 70 in a manner for relative movement of the two plates and the rollers that they support. To this end, the plate 72 is movable from a first position at which the two rollers are in contact at their nip to a position in the direction of arrow 90 to provide a space to receive the cord 40. Plate 72 is constantly biased toward plate 70 which will define a first position.

Figure 4:
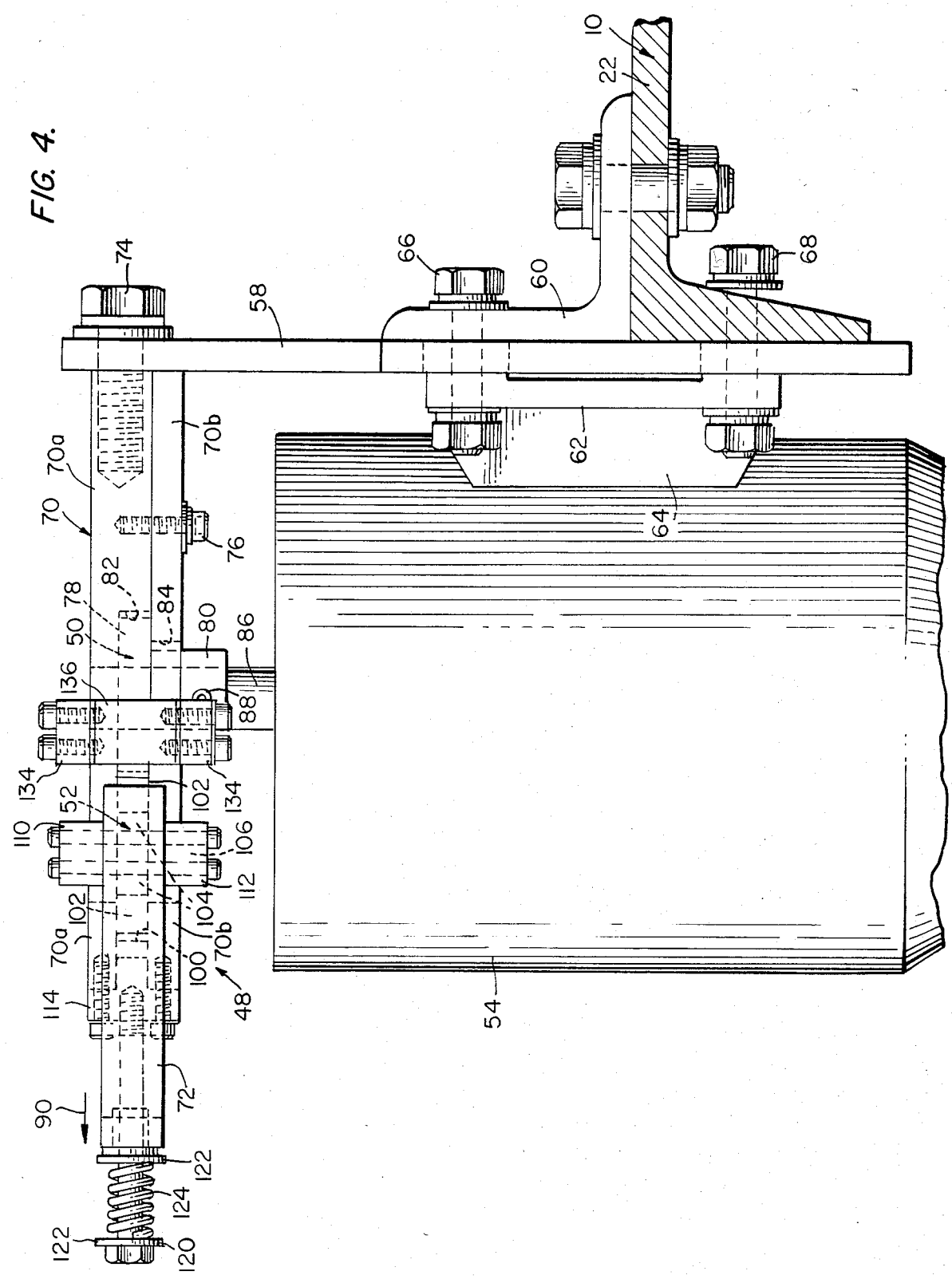
FIG. 4 is an elevational view of the assembly of FIG. 3.

Referring to FIG. 3, plate 72 includes a pair of legs 92, 94 which extend from a connecting web 96 toward a flat surface 98. The plate 72 is mounted to plate 70 in a manner whereby the legs 92, 94 are disposed laterally of the outer side walls of plate portions 70a, 70b and surface 98 enters into the region of the full cutout 82. Surface 98 includes a cutout 100 to accommodate a disc 102 of roller 52. The disc may be of nylon material. A bearing 104 supports the disc for rotation on a dowel 106. The plate portions 70a, 70b both include a slot 108 (see FIG. 4) elongated in the directions of movement of plate 72 to accommodate movement of roller 52 away from roller 50.

An upper and lower strap 110, 112 are received about plate 72 and provide a rectangular frame for receipt of the plate portions 70a, 70b.

A plate 114 is secured at the end of plate 70. More particularly, the plate 114 spans the plate portions 70a, 70b and the extension of cutout 82. The plate 114 serves two functions. Thus, the plate secures the plate portions in their superposed position, and the plate provides a mounting surface for bolt 116. The bolt extends rearwardly of plate 70 for receipt through a bore in web 96 of plate 72. A plurality of lock nuts 118 may be provided to fix the bolt in plate 114 and to adjust the relative position of the nip of rollers 50, 52 when plate 72 is biased toward plate 70. A further lock nut 120 is located at the remote end of bolt 116 and a pair of washers 122 are positioned along the bolt between the lock nut 118 and web 96. A spring 124 is located between the washers and provides a constant bias for purposes as discussed.

The sensing mechanism 56 may comprise a photoelectric sensor, for example. In the illustrated embodiment the sensing mechanism is carried in two housings. One housing 126 may be supported between straps 110, 112 for movement with plate 72, and another housing 128 may be supported below a plate 130 carried by plate portion 70a. A path 132 is schematically illustrated a sensor path of view. As may be obvious, the path 132 is at the height of the cord 40 which is driven by rollers 50, 52.

A pair of plates 134 are carried on plate 70 on the opposite side from the mount of sensing mechanism 56. The plates 134 extend laterally outward of plate 70 and a roller 136 is supported between the plates. The roller is mounted on dowel 138 and rotates freely to support cord 40 as it enters an opening 140 between the plates 70, 72 for movement between the nips of rollers 50, 52.

Figure 5:
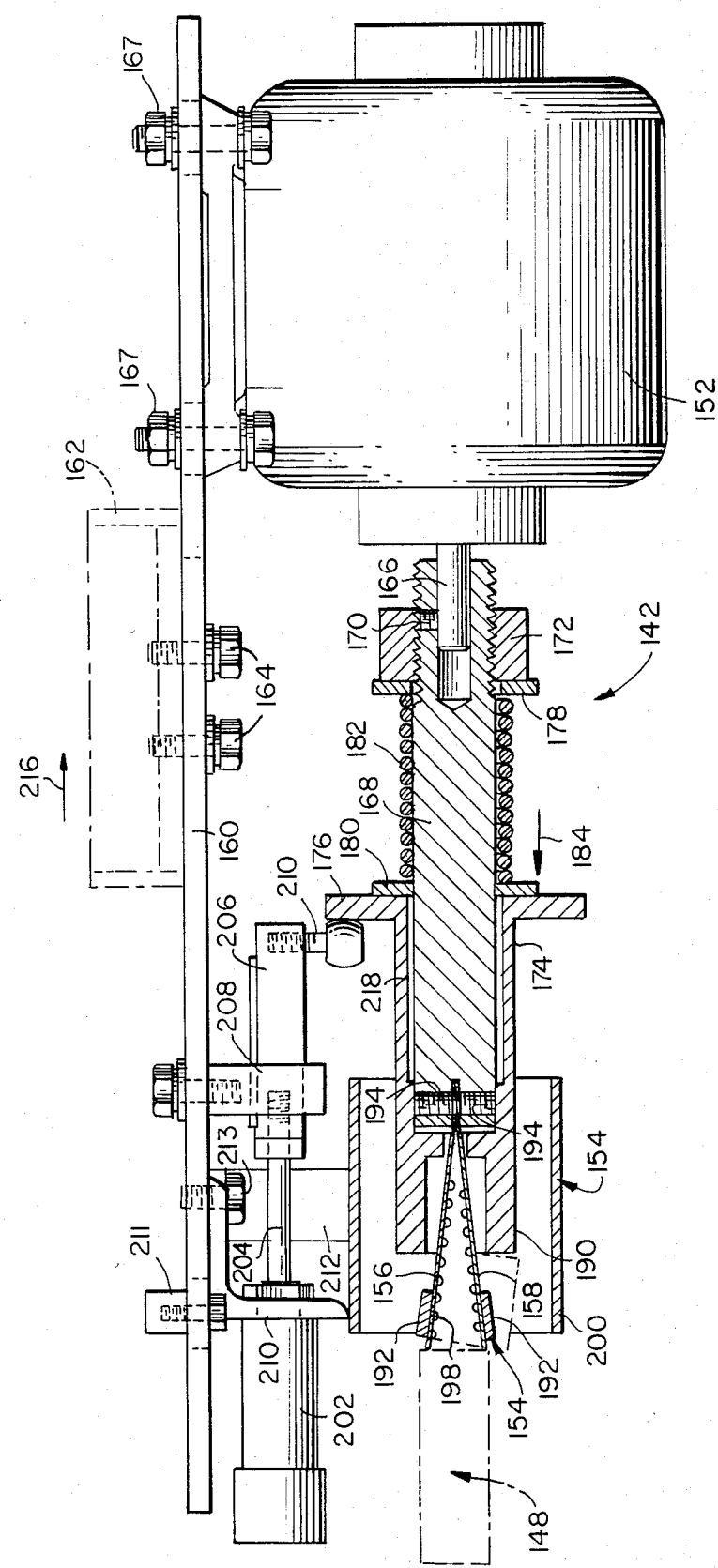
FIG. 5 is a plan view of a reversing drive assembly.

The reversing drive assembly 142 may be seen to best advantage in FIG. 5. However, a first reference to FIG. 1 will set the mounted environment for the reversing drive assembly on a cylinder 144. The cylinder may be a pneumatic cylinder and the reversing drive mechanism may follow movement of a spool or collar (not shown) but movable within the cylinder as pressure on one side of the spool or the other is vented or dumped to atmosphere. Initially the spool is subjected to equal pressures on the opposite sides so that it remains stationary. The movement of the spool in the appointed direction may commence relatively rapidly since there is no need for a pressure build-up to overcome the force of inertia. The control in movement of the spool may be at a panel 146. Cylinder 144 is conventional and may be of the type characterized as a "Magniband Pneumatic Cylinder".

With continued reference to FIG. 1, a support 148 is mounted on base 14 and a support 150 is carried on mount 22. The supports extend above the surface of the mount and base, and the cylinder is supported therebetween.

Reversing drive assembly 142 generally includes a motor 152, a chuck 154 and an operative structure for controlling a pair of jaws 156, 158 of the chuck to open and closed positions for gripping and releasing an end of cord 40. A plate 160 provides a mounting surface for the reversing drive assembly. The plate, in turn, is carried by a mounting bracket 162 of generally T-shaped outline. A base of the mounting bracket is disposed on plate 160 and a leg extends from the base. The leg of the mounting bracket is connected to the spool. Any type of connection may be used to provide a mounting connection and a following movement of the reversing drive assembly. A series of bolts 164 are used to mount plate 160 on bracket 162.

Referring now to FIG. 5, motor 152 is a reversible drive motor. A Bodine Electric Motor, Model No. 277, 115 volt, 0.65 amp motor capable of operating at 1725 rpm to develop 1/20 HP has been used successfully to reverse wind cord 40.

Motor 152 includes a drive shaft 166 which extends substantially from the motor housing. A plurality of bolts 167 mount the motor on plate 160. A rod 168 is received on shaft 166. Connecting structure, illustrated as a set screw 170, may be used to secure the rod on the shaft for conjoint movement. A nut 172 is threaded on the end of rod 168. Rod 168 supports a collar 174 including a flange 176 and a pair of washers 178, 180. A spring 182 acts between the washers. One washer is located against nut 172, and capable of adjustment with the nut, while the other washer is juxtaposed to the flange. The spring is maintained in compression to bias collar 180 in the direction of arrow 184.

The jaws 156, 158 of chuck 154 are formed by a pair of spring steel blades. The blades may be opened and closed under control of the collar 174. As illustrated in FIG. 5, the pair of jaws are open. The pair of jaws will close as the collar 174 moves in the direction of arrow 184, and as a mouth 190 of the collar rides on a pair of blocks 192 to cam the jaws closed.

Each blade forming the pair of jaws is supported in a slot by a pair of set screws 194. A strip 196 including a plurality of extending nubs 198 is located to each facing surface along the blades with the jaws so that the nubs project from one strip toward the other strip. Preferably, the nubs are positioned so that they will interdigitate when the jaws are closed. Each strip may be adhesively or otherwise secured along the blade. The nubs act to grip cord 40, normally somewhat slippery because of a surface coating of silicon, more securely.

A guard 200 is supported about the jaws to somewhat shroud a dotted line presentation of structure representing the sensing mechanism 56 of the drive assembly 48. The relationship of these structures is close and, actually, the open end of the jaws may be as close as about one-eighth of an inch beyond the sensing mechanism. In this manner the jaws will normally engage the leading end of cord 40 before it is able to move in any uncontrolled manner out of a path in alignment with the jaws. The tendency for the cord to move in an erratic way in any direction is caused by the fact that the cord was coiled and as soon as it passes through the rollers 50, 52 and sensing mechanism 56 it tends to coil again. Actually, the leading end of the cord presents an uncoiled length which may range from an inch and one-half to two or more inches. The shorter this length, the more difficult it is to grasp the leading end. The operation has been carried out successfully with a spacing between the structures of about one-eighth of an inch.

A cylinder 202 controls the opening and closing of the jaws 156, 158. To this end, the cylinder which may be a pneumatic controlled cylinder includes a rod 204 movable under control of a piston (not shown). A slide shaft 206 is connected to the rod and movable within a guide 208. A follower 210 extends downwardly from the slide shaft in position to act against the flange 176 of collar 174. Therefore, when the rod 204 and slide shaft 206 move to the right (in the Figure), the collar follows the movement, against the bias of spring 182, to allow jaws 156, 158 to open. The blades forming the jaws tend to move toward the open position. When the rod and slide shaft move to the left the jaws close under control of the collar, bias by the spring acting against flange 176 of the collar. A bracket 210 mounts the cylinder and a plurality of bolts 211 secure the bracket to plate 160. A bracket 212 mounts guard 200, and is also secured to the plate by a plurality of bolts 213.

The operation of the apparatus may be considered to follow the following discussion. A mandrel 38 with a cord 40 of any length coiled therearound is taken from a machine (not shown) within which the coil is formed. The mandrel may support a cord of any length and the apparatus may act on that length to reverse the direction of wind of the coil and create a coil which is tighter than the coil initially formed on the mandrel. The tightening operation is one required on all formed coils, and the apparatus has operated successfully with a mandrel carrying a cord of about twentyfive feet in length.

The mandrel carrying the cord is placed on the apparatus in position supported between the brackets 34, 36, with the slide 26 initially located to the extreme right hand end (see FIG. 1) of runner 24. The positioning of the slide in this fashion should position the leading end of cord 40 approximately at the "pay-off" position so that the cord may be progressively and continuously stripped from the mandrel.

The leading end of cord 40, then, is hand located to the point of entry 140 to the nip between rollers 50, 52 of the drive assembly 48. The cord has enough longitudinal stability to follow a forward thrust and as the roller 50 is rotating under control of motor 54 the knurled surface of the roller will grip the cord and drive it toward path 132. The forward thrust will cause the nip of rollers 50, 52 to spread to accommodate the cord. Within a very short period of time the cord will actually block the light from a source in one housing 116 from impinging upon a photoelectric device in the other housing 118. In hand feeding the cord the leading end stripped from the mandrel is moved in a direction tangent to the surface of the mandrel around roller 136, into the opening 140 and through the nip of the rollers. The path of movement may be between a pair of plates which tend to maintain the cord in a non-coiled condition between the mandrel and opening 140. Motor 54 may initially drive roller 50 at a first speed and increase the drive to a second speed relatively quickly as the automatic operation commences. This manner of drive will overcome the possibility of a rapid jerk being imparted to the cord in overcoming inertia. A rapid jerk may result in stretching of the cord or some other deleterious damaging action.

A signal from sensing mechanism 56 operates a solenoid in an electrical panel 214 to control the various operations. The operations have been briefly discussed, above. More particularly the electric panel, in concert with the pneumatic panel 146, controls operation of the chuck 154 to close the jaws 156, 158, operate the cylinder 144 so that the reversing drive assembly begins movement in a direction of arrow 216 away from the drive assembly 48, and after a time delay to cause motor 152 to drive the chuck 154 in rotation.

A bushing 218 is located between rod 168 and collar 174 to reduce friction in rotation and provide greater freedom of movement of the rod.

The operation of chuck 154 in grasping the cord is quite rapid for the reasons previously discussed. The operation of cylinder 144 is a controlled operation in movement of the reversing drive assembly 142, and while the reversing drive assembly commences movement away from the drive assembly upon operation of the solenoid, the movement does not pull the cord 40, but rather supports the cord in movement away from the drive assembly 48 to accommodate the length of the cord which has been pulled and stripped and driven, and which is undergoing reverse rotation. The leading end of cord 40 is not subject to reverse winding which commences after movement of reversing drive assembly. Only the head formed length of the cord is reverse wound.

The rollers 50, 52 provide an additional important function. To this end the rollers immobilize the cord rotationally at the transition point so that the chuck reverses the length of the cord between the end and the point of immobilization. As indicated, reverse winding is carried out as the chuck is moved following a brief time delay after closure of the jaws. Movement is imparted to the reversing drive assembly by draining or dumping the pressure build-up on the right side of the spool to atmosphere. The movement is substantially instantaneous since the cylinder to the left of the spool remains under pressure.

Operation continues until the end of cord 40 moves out of the nip between rollers 50, 52. During operation slide 26 locates toward the second position to position the cord being stripped from the mandrel 38 at a location in front of the point of entry 140 to the nip between the pinch rollers 50, 52. As the trailing end of the cord exits the nip between the pinch rollers the plates 70, 72 move together to hold the trailing end of the cord in place. The cord, thus, continues to block the light for the photoelectric device.

The operator, however, will be alerted to this condition by either visual or alarm recognition so that the end of the cord may be pulled free of the plates. This is not a difficult action. While the cord is gripped sufficiently by the plates the gripping action is easily overcome. When the cord is fully reverse wound it may be released from the plates. This pulling release unblocks the photoelectric device and the electrical panel, operating with the pneumatic panel 146, causes the chuck to discontinue rotation as the jaws of the chuck simultaneously open to release the cord into a bin (not shown). The spool is also simultaneously moved in the opposite direction to return the reverse drive assembly in the position closely juxtaposed to the drive assembly. As the second and each subsequent operation commences, this disposition of proximity is important so that the chuck will catch the lead end of cord 40 in the fly. The slide and mandrel then are manually returned to the first position at which the empty mandrel is removed and replaced by each subsequent mandrel for a repeat of the operative steps.

We claim:

1. A method winding a cord to a coiled configuration having a coil tighter than the coil of said cord when disposed in a lay of winding on an elongated, rodlike element comprising continuously stripping said cord from said element while moving said element along a first path to a pay-off position, said cord after it is stripped being moved along a path of movement generally perpendicular to said first path, driving said cord along a second path from a fixed transition point while substantially simultaneously immobilizing said cord against rotation at said transition point, gripping an end of said cord, and reverse winding continuously the increasing increments of lengths of said cord between said gripped end and transition point in a direction opposite said initial direction of winding.

2. The method of claim 1 wherein said movement of said element is synchronized with the drive of said cord so that said cord is pulled and stripped to provide uniformity of any elongation of said cord.

3. The method of claim 2 wherein said second path is coaxial with said path of movement toward said transition point.

4. The method of claim 2 wherein said second path is in a direction generally opposite to said first path.

5. The method of claim 1 wherein said cord driven along said second path is immediately gripped.

6. The method of claim 5 including moving said gripped end of said cord along said second path to accommodate an increasing length of cord between said gripped end and said transition point.

7. Apparatus including support means for supporting an element and a cord coiled in a lay of winding along the length of said element, means for moving said element in one direction for locating a leading end and each supported increment of said coiled cord along its length to a pay-off position at which said coiled cord is constantly and progressively pulled and stripped from said element, means for pulling and stripping said coiled cord from said element as said element moves in said one direction and imparting to said cord a driving impetus whereby said cord moves from a transition point in a downstream direction, said pulling and stripping means also preventing substantially any degree of rotation of said cord at said transition point, means for gripping the leading end of said cord, means for rotating said gripping means in a direction to reverse wind the free length of said cord between said gripping means and said transition point to coil said cord in a coil tighter than said coiled cord when supported on said element, and means for moving said gripping means in said downstream direction to accommodate the accumulating length of reversed coiled cord.

8. The apparatus of claim 7 wherein said pulling and stripping means is disposed at a fixed location relative to said pay-off position, and substantially at right angles to the path of movement of said element.

9. The apparatus of claim 8 wherein said pulling and stripping means comprises a pair of pinch rollers, frame means for supporting each pinch roller, and one of said frame means adapted to support a pinch roller being biased toward the other frame means to adjust a nip between pinch rollers to both accommodate said cord and drive said cord, without rotation, in said downstream direction.

10. The apparatus of claim 9 including a sensing means to sense a presence or absence of said cord driven in said downstream direction.

11. The apparatus of claim 7 wherein said gripping means comprises a pair of jaws, and means for supporting said jaws in position closely adjacent said transition point to gresp the end of said cord as it moves in said downstream direction.

12. The apparatus of claim 11 including means providing a plurality of projections from a surface, one surface and projection mounted on each of said jaws for more positively gripping said cord when said jaws are closed.

13. The apparatus of claim 11 further including a collar, means including an output shaft of a drive motor for supporting said collar, said collar support means mounting said jaws whereby relative movement of said jaws and collar moves said jaws between positions at which the jaws close on said cord and release said cord, and said jaws being adapted to be driven in rotation to reverse wind said free length of cord.

14. The apparatus of claim 10 wherein said means for moving said gripping means comprises a pneumatic operator, said pneumatic operator adapted to move said gripping means in said downstream direction when said sensing means senses the presence of said cord.

* * * * *

UNITED STATES PATENT AND TRADEMARK OFFICE
CERTIFICATE OF CORRECTION

PATENT NO. : 4,508,278

DATED : April 2, 1985

INVENTOR(S) : Robert N. Harris
Michael E. McGuire

It is certified that error appears in the above-identified patent and that said Letters Patent is hereby corrected as shown below:

Column 10, line 57, after "method" insert

--of reverse--.

Column 12, line 21, "gresp" should be --grasp--.

Signed and Sealed this

Thirteenth Day of August 1985

[SEAL]

Attest:

DONALD J. QUIGG

Attesting Officer     Acting Commissioner of Patents and Trademarks